(12) United States Patent
Kirn et al.

(10) Patent No.: US 6,630,766 B1
(45) Date of Patent: Oct. 7, 2003

(54) STRIP FOR PRODUCING A RING-SHAPED ELECTROMAGNETIC ELEMENT FOR AN ELECTRIC MOTOR

(75) Inventors: Oliver Kirn, Fellbach (DE); Georg Senn, Densburen (CH); Roland Zieker, Ebersbach (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/831,405
(22) PCT Filed: Nov. 8, 1999
(86) PCT No.: PCT/EP99/08540
§ 371 (c)(1),
(2), (4) Date: Jul. 6, 2001
(87) PCT Pub. No.: WO00/28639
PCT Pub. Date: May 18, 2000

(30) Foreign Application Priority Data

Nov. 9, 1998 (DE) .......................................... 198 51 363
Aug. 3, 1999 (WO) ................................ PCT/EP99/05629

(51) Int. Cl.[7] .......................... H02K 15/02; H02K 1/00; H02K 1/06
(52) U.S. Cl. .......................... 310/254; 310/42; 310/216; 310/261; 29/596
(58) Field of Search .................................. 310/216, 217, 310/42, 254, 259, 261; 29/596

(56) References Cited

U.S. PATENT DOCUMENTS

| | | | |
|---|---|---|---|
| 3,842,493 A | 10/1974 | Ohuchi et al. | 29/596 |
| 4,102,040 A | * 7/1978 | Rich | 29/596 |
| 5,256,926 A | 10/1993 | Hagenlocher et al. | 310/259 |
| 5,859,486 A | * 1/1999 | Nakahara et al. | 310/216 |

FOREIGN PATENT DOCUMENTS

| | | | |
|---|---|---|---|
| DE | 2629532 C2 | 11/1988 | H02K/15/02 |
| DE | 196 33 399 A1 | 2/1998 | H02K/1/18 |

OTHER PUBLICATIONS

Patent Abstracts of Japan, Publication No. 10322943, "Motor Stator" by Wakashin Yasuhiko, Published Dec. 4, 1998.
Patent Abstracts of Japan, Publication No. 11215745, "Electric Motor and Formation of Stator Core", by Kurosawa Masahiko, Aug. 6, 1999.
Patent Abstracts of Japan, Publication No. 10327545, "Stator of Dynamo Electric Machine", by Sato Toshiichi, Dec. 8, 1998.
Patent Abstract of Japan, Publication No. 07274422, "Method for Winding Electric Rotary Machine", by Suzuki Tsuruji, Oct. 20, 1995.

* cited by examiner

Primary Examiner—B Mullins
(74) Attorney, Agent, or Firm—Crowell & Moring LLP

(57) ABSTRACT

An essentially elongated strip is formed for manufacturing a ring-shaped element of an electrical machine. The strip has an electromagnetic effective area which is oriented perpendicularly to an axis of rotation of the ring-shaped element. The strip is essentially elongated, and has segments which are separate from one another and together form the effective area of the element. Adjacent segments are directly connected in each case by a web which is integrally formed on the outside of the element. The web is formed in such a way that it absorbs an elastic deformation during the bending of the strip, whereas the segments remain essentially free of elastic deformation.

27 Claims, 6 Drawing Sheets

STRIP FOR PRODUCING A RING-SHAPED ELECTROMAGNETIC ELEMENT FOR AN ELECTRIC MOTOR

BACKGROUND OF THE INVENTION

The present invention relates to a strip for manufacturing a ring-shaped electromagnetic element for an electrical machine.

German publication DE 26 29 532 C2 discloses a method of manufacturing a ring-shaped element out of electromagnetic material in which a strip is rolled up to form a ring for forming a stator or rotor of an electrical machine.

German publication DE 196 33 399 A1 discloses a strip for manufacturing a ring-shaped element of an electrical machine. The strip consists of segments which are separate from one another and together form the effective area of the element. Adjacent segments are directly connected to one another in each case by a web.

SUMMARY OF THE INVENTION

The object of this invention is to specify a strip with which the production of ring-shaped electromagnetic elements for electrical machines is simplified.

This object is achieved in a strip of the general type mentioned. The strip according to the invention is formed from segments which are separate from one another and together form the effective area of the element. Adjacent segments are directly connected in each case by a web. The web is integrally formed on the outside of the element. The web is formed in such a way that it absorbs an elastic deformation during the bending of the strip, whereas the segments remain essentially free of elastic deformation.

The special advantage is that this web, during the forming of the strip from an essentially elongated state to a ring shape, leads to a situation in which an essentially continuous, positive-locking connection of the segments can form at their respective butt joints. The butt joints in the formed ring-shaped electromagnetic element are formed so effectively that at most a minimum air gap is left. This air gap entails virtually no electromagnetic losses.

During bending, the preferred geometry and arrangement of the web provides for the edges to come into contact along the forming butt joint between the regions and for these edges to also remain in contact in a largely positive-locking manner. Otherwise, a situation may occur in which the edges certainly first come into contact during the bending of the strip, but regions of these edges become detached from one another during the further bending along the butt joint. The air gap forming in the process would greatly impair the functioning of the ring-shaped electromagnetic element in the electrical machine.

The strip is easy to manipulate and is robust and enables a rotor and/or stator to be manufactured with optimum use of material, for instance during the stamping of the strip. Cost-effective manufacture of rotor and/or stator parts of an electrical machine thus becomes possible.

Furthermore, the special shaping of the web prevents arching of the web during the bending, so that the strip has a flat electromagnetic effective area. Such rotors and/or stators manufactured by means of the strip exhibit virtually no losses due to the butt joints, so that such components may also be used for heavy-duty machines, in which, for instance, the stator is acted upon by a high magnetic field in which the electromagnetic effective area is saturated. Any mechanical stresses in the strip material are also prevented from affecting the electromagnetic properties of the strip, since the web absorbs the mechanical deformations. Although the web itself can carry magnetic flux, in the design per se it is preferably not part of the actual electromagnetic effective area of the ring-shaped electromagnetic element which is formed with the strip.

In a further preferred embodiment, the strip is provided with toothing at least on one side, this toothing preferably being provided as rotor and/or stator teeth. In a preferred embodiment in which the strip is bent to form a stator, an electric coil of coil wire is wound around stator teeth in the elongated strip, the cross-sectional shape of the coil wire being varied during the winding. Advantageous utilization of the space between the stator teeth is thus possible. Since this may be effected before the forming of the strip, mechanized manufacture and attachment of the coil or the coils are possible, since the stator teeth at this point in time are freely accessible.

In a further favourable embodiment, the outside diameter of the coil, during the winding of the coil about the stator tooth, is varied in such a way that the largest outside diameter of the coil is formed at the subsequent slot root. The coil is thus already largely preformed in such a way as would correspond to its final shape after the bending. Further advantageous utilization of the space between the stator teeth is thus possible. Both the wire cross section and the diameter of the coil may be varied during the winding of the coil.

Further advantages and refinements of the invention follow from the claims and the description.

BRIEF DESCRIPTION OF THE DRAWINGS

The invention is described in more detail below with reference to drawings, in which.

DESCRIPTION OF THE PREFERRED EMBODIMENTS

The present invention is suitable for the manufacture of electrical machines which have a stator and a rotor, such as, for instance, asynchronous machines, reluctance machines and the like.

Figure 1:
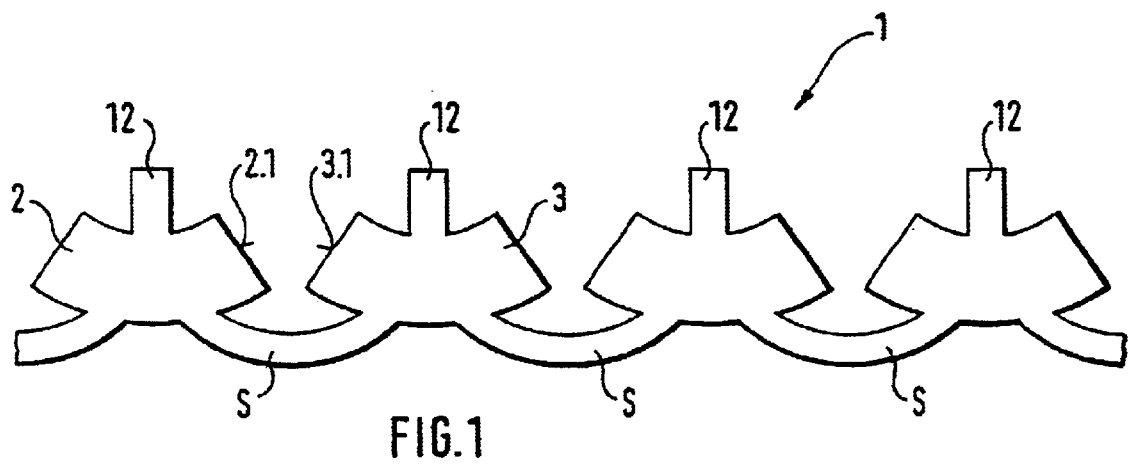
FIG. 1 shows a diagrammatic representation of a strip according to the invention.

A simplified diagrammatic illustration of a strip 1 according to the invention is shown in FIG. 1. The strip 1 is essentially elongated. It is bent into the ring shape and then preferably forms a stator or a rotor of an electrical machine.

The strip 1 is composed of a plurality of individual segments, which as a whole form an effective area of the electromagnetic element. In each case two directly adjacent segments of the segments separate from one another are in each case connected by a web S. The web S is arranged on that side of the strip 1 which forms the outer surface of the ring-shaped element. A first segment 2 having a first lateral edge 2.1 is adjacent to a second segment 3 having a second lateral edge 3.1. The segment 2 is connected to the segment 3 by means of a web S which is at a distance from the edges 2.1, 3.1. The web S is connected to the segments 2, 3 in an integral manner. The surface of these segments 2, 3 and the surface of the remaining segments of the strip 1 form the actual electromagnetic effective area of the subsequent electromagnetic element of an electrical machine. The normal of the effective area is to be considered to be perpendicular to the plane of the figure.

In addition, the segments also have toothing with one tooth 12 each on that side of the strip 1 which is opposite the side having the webs S. The segments may also have more than or less than one tooth 12.

The number of segments of a strip which are connected to the webs S can be adapted to the circumference and/or radius of curvature of a ring-shaped electromagnetic element which is to be formed from the strip and may be less than or greater than the number of segments shown in the figure.

The webs S, in principle, can certainly also direct magnetic flux but can preferably be disregarded in the design of such an element. In this sense, the webs S run outside the effective area of the electromagnetic element.

The strip 1 may be formed from solid material. The strip 1 preferably consists of a laminated pack, the laminations being arranged in layers one on top of the other perpendicularly to the normal of the effective area. The strip 1 is expediently stamped out, assembled from identical strips as a laminated pack and then bent into the ring shape. The strip 1 preferably has metallic, ferromagnetic or paramagnetic properties.

After the bending, the webs S may Advantageously serve as a material inventory in order to connect the individual laminations of the ring-shaped electromagnetic element, consisting of a preferred laminated stack, by means of welds parallel to the axis of rotation of the element.

The webs S have a curvature in the same direction as the bending direction and are arranged on that side of the strip 1 which is provided as an outer margin of the ring-shaped electromagnetic element.

The function of the webs S is to absorb the elastic deformation during the bending of the strip 1, so that the effective area or a segment of the strip 1 does not have to absorb compression or extension in the circumferential direction. Thus the effective area remains flat, and elastic distortions do not affect the electromagnetic properties of the segments of the strip 1.

The web S is formed in such a way that, during the bending, the elastic deformations are absorbed so effectively that the edges 2.1 and 3.1 form a butt joint, which is essentially positive-locking and causes only a minimum air gap. This air gap is so small that no efficiency losses are observed even in heavy-duty machines, in which, for example, the stator is operated to a high degree of magnetic saturation.

Figure 2:
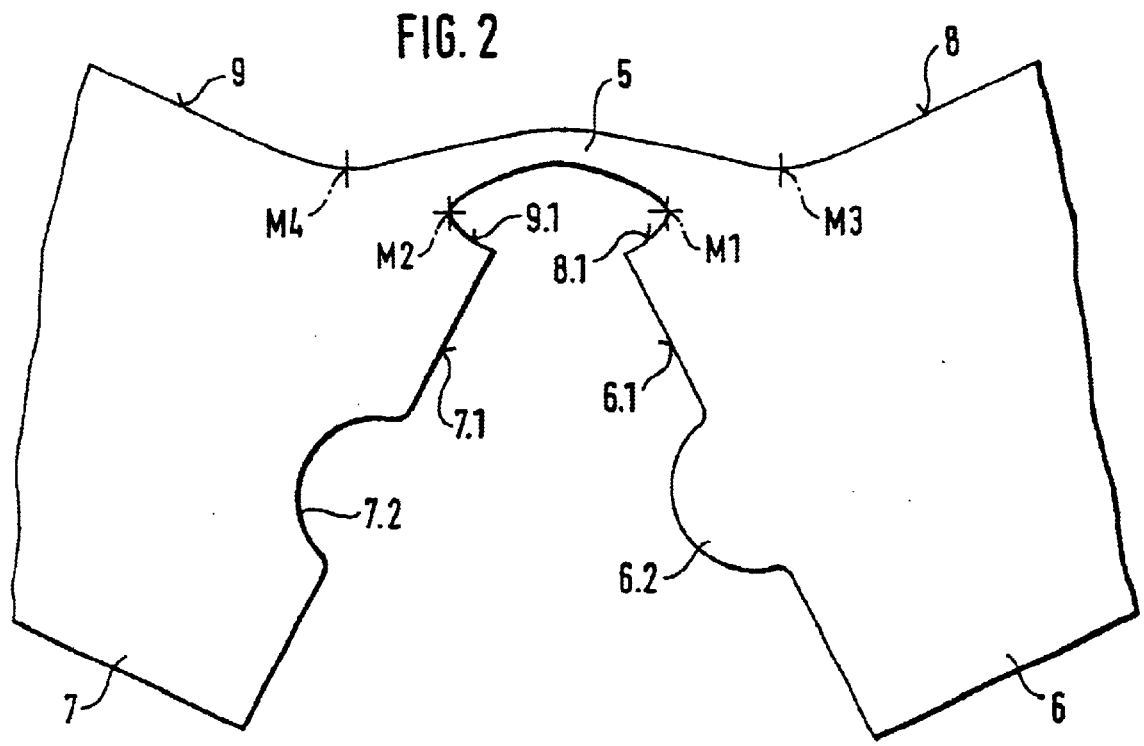
FIG. 2 shows a detail of a strip according to the invention.

This advantage is achieved by favorable shaping of the web S, as shown in FIG. 2. Without this favorable shaping, a situation may arise in which the edges, in the course of the bending, certainly first of all come into contact starting from a first contact location, but then move away from one another again during the further bending and form a large air gap. The butt joint is then not closed in a positive-locking manner and then leads to electromagnetic losses during use.

FIG. 2 shows a detail of a preferred strip 1 having a web between two segments of the strip. The web 5 connects a first region 6 having a first lateral edge 6.1 and a second region 7 having a second lateral edge 7.1. The web 5 is rounded and has smooth transitions to the effective area of the strip 1, into which it merges in the region of a first bottom edge 8 of the first zone 6 and in the region of a second bottom edge 9 of the second zone 7. The bottom edges 8, 9 and the corresponding bottom edges of any further segments of the strip 1 form the outside of the ring-shaped element which is subsequently bent from the strip 1.

The web 5 and the regions 6, 7 enclose a zone which is roughly in a lozenge shape with rounded edges. To this end, the adjacent sections 8.1 and 9.1 of the bottom edges 8, 9 may be considered to be extended up to their intersecting point.

The web center of the web 5 is narrower than the width of the web 5 at the regions of the web 5 which merge into the regions 6, 7 and is as a whole the narrowest point of the web 5. It thus defines a predetermined bending point of the web 5 and thus of the strip 1. The longer diagonal D1 of the lozenge shape runs between a first point M1 and a second point M2 of the web 5 at which the latter merges into the bottom edges 8 and 9.

The width of the web 5 at the transition to the regions 6, 7 corresponds to the distance between the first point M1 and a further point M3 merging into the region 6 and respectively the distance between the second point M2 and a further point M4 merging into the region 7. These distances are preferably identical.

Figure 3:
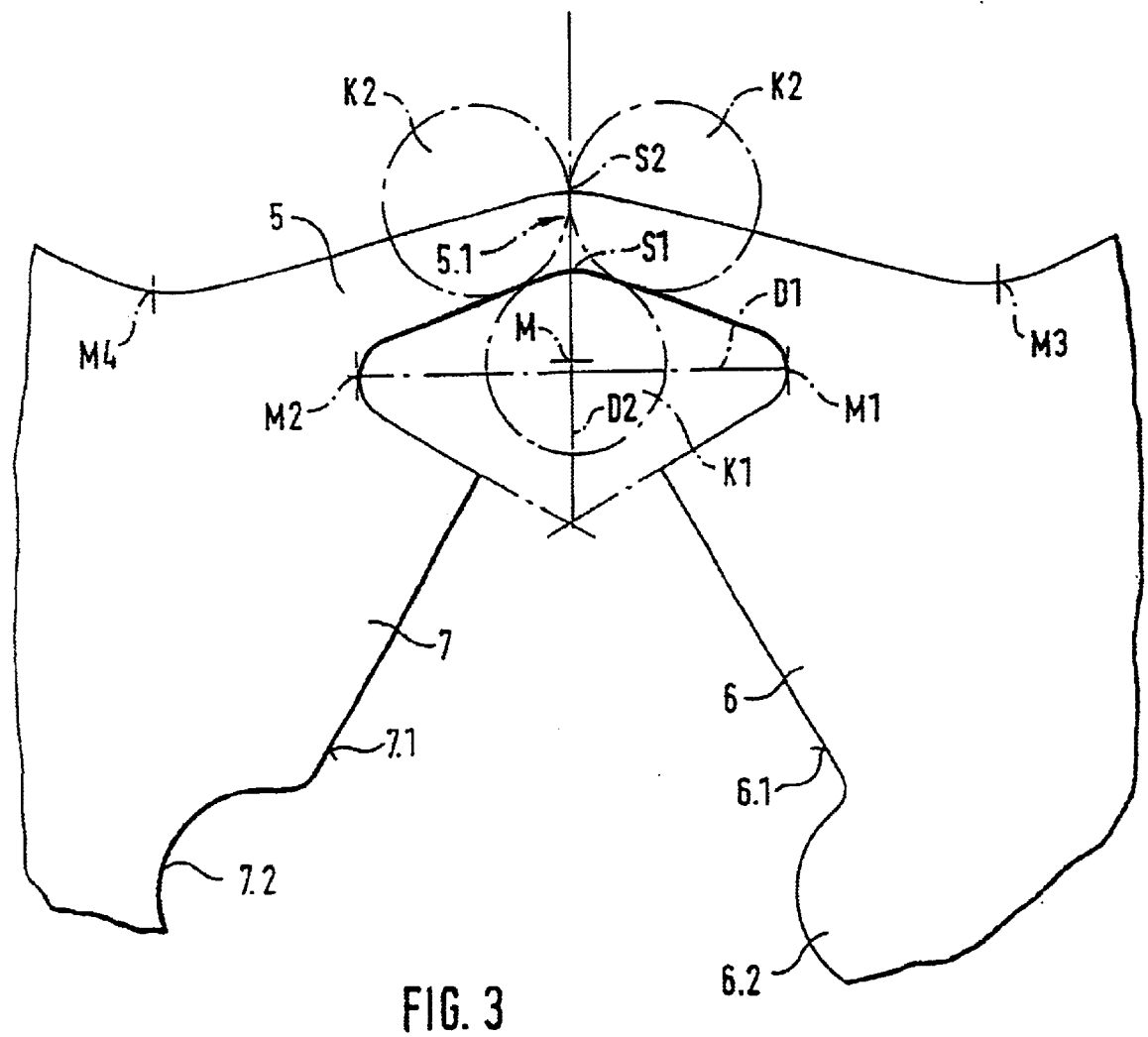
FIG. 3 shows a further detail of a preferred strip.

A further detail of the web is shown in FIG. 3. The contours of the web 5 are preferably rounded. In the region of the web center 5.1, that contour of the web 5 which is close to the lozenge conforms to an arc of a first circle K1, the center M of which lies on the shorter diagonal D2 of the lozenge shape, the radius R1 of the circle K1 being smaller than the shorter diagonal D2. The opposite web side preferably conforms to an arc of a further circle about the same center M, this further circle having a larger radius, which, however, is less than twice the radius of the first circle K1; the radius is preferably 1.5 to 1.8 times as large.

The web center 5.1 is defined by the intersecting point S1 between the first circle K1 and the shorter diagonal D2.

In this case, the width of the web center 5.1 corresponds to that section on an extension of the shorter diagonal D2 which lies between the web-side intersecting point S1 between the first circle K1 and the shorter diagonal D2 and a contact point S2 between a second circle K2 and the extension of the shorter diagonal D2, the second circle K2 touching the first circle K1 at a point close to S1. Both circles K1, K2 have the same radius R1.

In a further favorable development of the invention, toothing is additionally formed on the lateral edges 6.1, 7.1, e.g. a bulge 6.2 on one lateral edge 6.1 and a geometrically corresponding notch 7.2 on the other lateral edge 7.1, so that these edges 6.1, 7.1 form a tooth system when bent together. The butt joint thus becomes more robust, and a possible adverse effect of the butt joint on the electromagnetic properties is further reduced. Toothing as indicated in the figure is also suitable for assisting the subsequent bending operation and for helping to bring the segment edges together.

However, a plurality of teeth may also be provided, or the teeth or the tooth may have a different shape from that shown in the figure.

Figure 4:
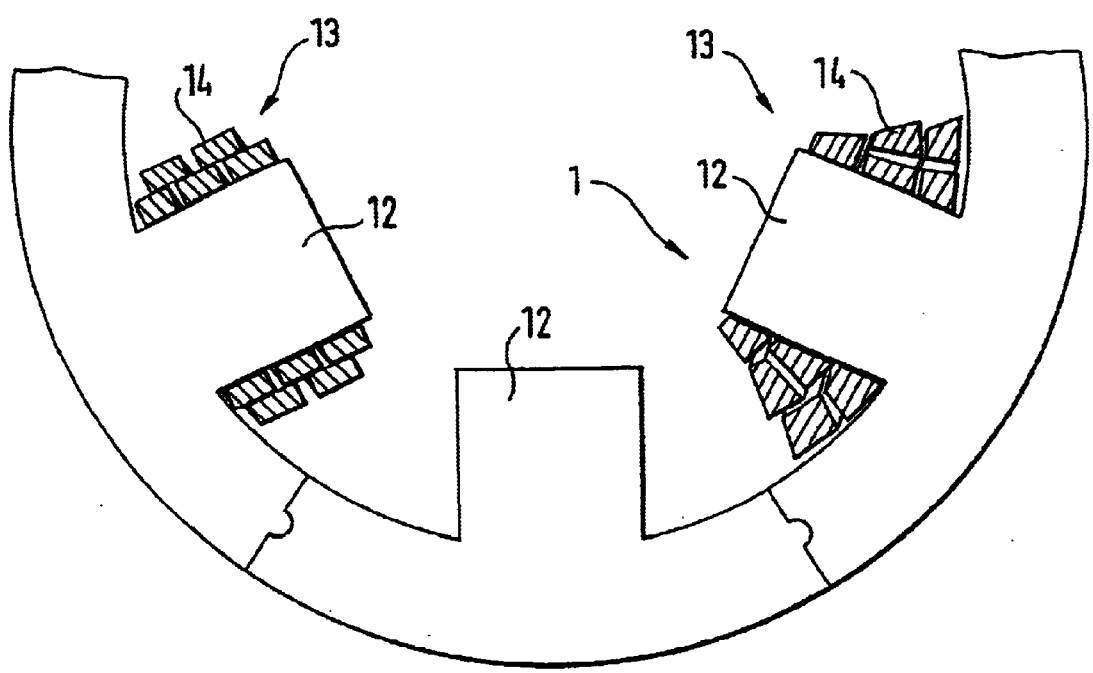
FIG. 4 shows a further preferred embodiment of a strip according to the invention with toothing.

In a further favourable development of the invention, toothing is additionally formed on the bottom edges 8, 9 and/or on the top edges 10, 11 of the strip, this toothing being intended to subsequently form, for example, rotor or stator teeth after the forming of the strip. This is shown in FIG. 4.

In a preferred rotor, it is possible to already fit these teeth 12 with one or more electric coils 13 of coil wire 14 before the elongated strip 1 is formed into the ring shape. The teeth 12 are then freely accessible and may advantageously also be wound mechanically, which makes the assembly considerably less complicated. The coil wire 14 is preferably produced from a material containing copper and/or aluminium.

It is now just as simple to attach any electrical insulation between the strip material and the electric coil 13, in particular slot root insulation, in the regions between the teeth 12. In the case of a closed ring shape, the fitting of slot root insulation is made considerably more difficult.

In addition to the advantage of the possible mechanized production during the coil assembly, a further advantage may be seen in the fact that the degree of filling of the electric coils between the teeth 12 can be improved by the free accessibility during the winding, whereby the efficiency of an electrical machine is improved.

A preferred measure consists in already varying the coil wire 14 in its cross-sectional shape when winding it to form the coil 13 in such a way that the filling factor of the wires between the teeth is as large as possible after the bending and the wire 14 can be adapted as effectively as possible to the curvature and angles, which are then present, of the strip 1 and the teeth 12.

A further favorable design is to vary the outside diameter of the coil 13, in particular the winding width along a tooth 12. The largest outside diameter of the coil is expediently located at the subsequent slot root of the strip 1.

Especially in the case of rigid coil wires having a large cross section, it is difficult to achieve a high filling factor of the coil material. The free accessibility of the teeth 12 of the strip 1 and the possibility of already preforming the coil wire and coil in the desired manner constitutes a marked improvement and simplification in the manufacture of an electrical machine.

The strip 1 is then formed into the stator or rotor. This may expediently be done in two ways. Either the strip 1 is bent with a suitable tool and given a closed ring shape by the two band ends being connected, or the electromagnetic element is assembled from a plurality of such strips in the circumferential direction until a closed ring shape results.

The ring shape is fixed in its final form. The butt joint can be closed, in particular welded or adhesively bonded, with a suitable joining tool in order to minimize air gaps. The joint locations of the bent strip 1 run in a plane which is arranged perpendicularly to the central axis of rotation of the ring-shaped element.

The webs 5 may now be used again in a favorable manner by the material of the webs being used during the welding of the laminations, stacked one on top of the other, on the lateral surface of the ring-shaped element if the strip 1 is formed from a laminated pack.

The stator or rotor according to the invention is suitable for various electrical machines, in particular for a reluctance machine or also an asynchronous machine.

Here, the quite exceptional advantage is that the manufacture according to the invention of the stator permits a considerable saving of material. During the stamping of stator laminations having a closed circumference, a considerable quantity of scrap material accumulates, both from the interior of the stator and, in particular in the case of round stator laminations, from the outer region. During the stamping of elongated strips, which are only then bent or assembled to form a closed circumference, the starting material, on account of the more favourable geometry of the strips, can be better utilized and the quantity of scrap can be reduced. This also results in a considerable cost saving during the production of an electrical machine.

Figure 5A:
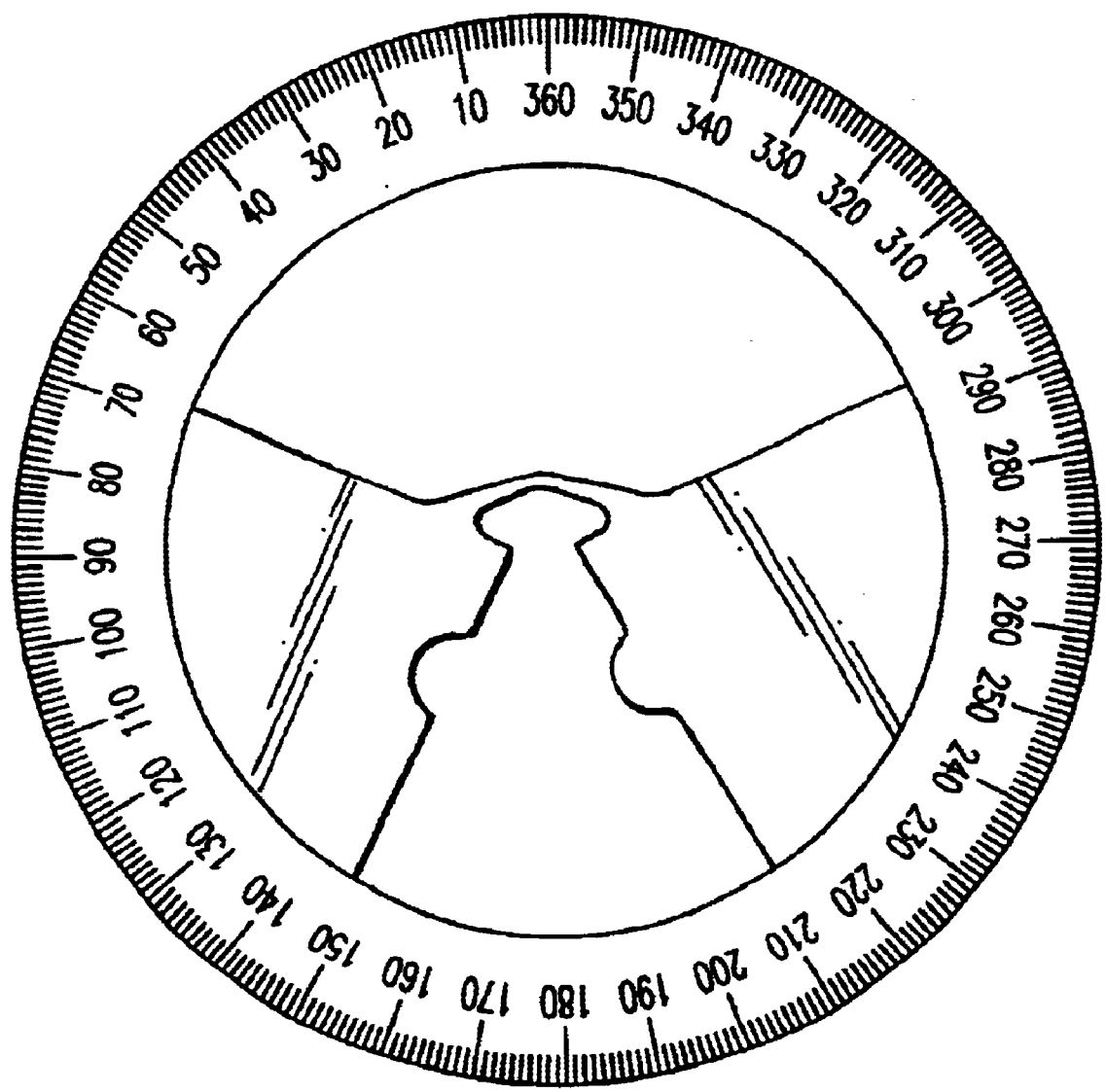
FIGS. 5a, 5b and 5c show a strip before, during and after forming a ring-shaped element from the strip.
Figure 5B:
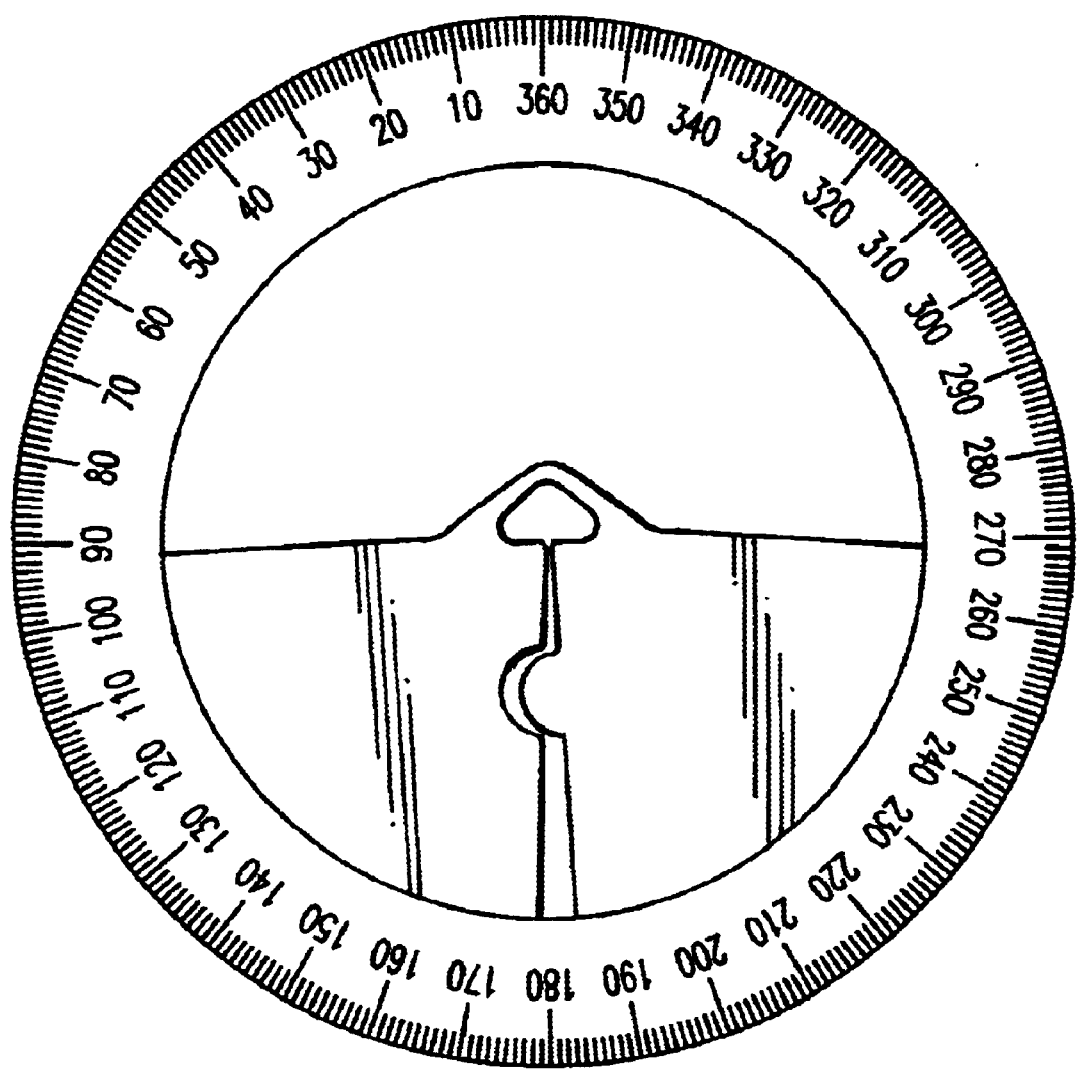
Figure 5C:
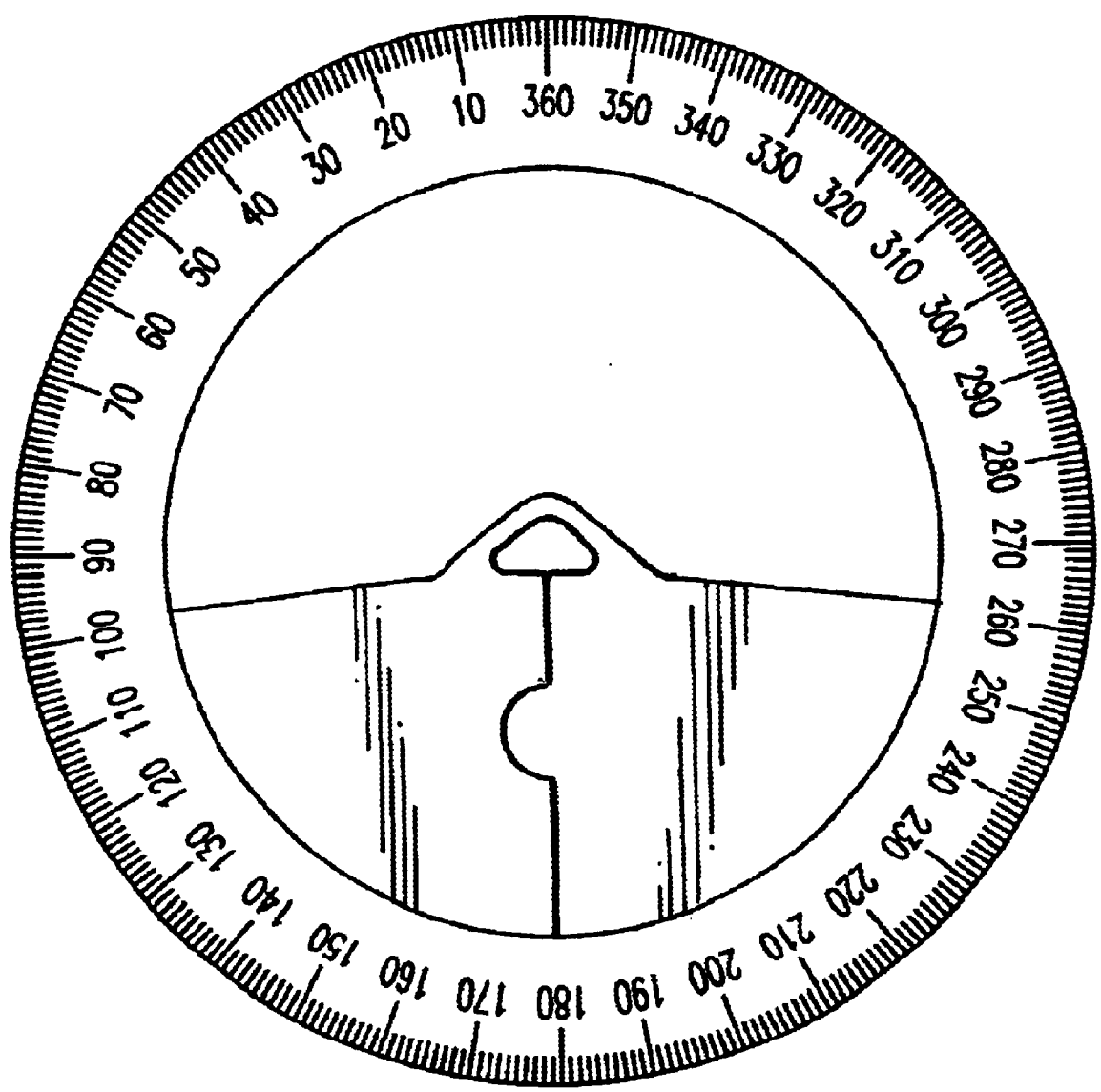

A plurality of steps before, during and after forming a strip into a ring-shaped element are shown in FIGS. 5a, 5b and 5c. Here, in each case a region close to a web 5 can be seen in plan view in order to further illustrate the effect of the web 5 during the bending operation.

In FIG. 5a, before the bending operation, the strip 1 can still be seen in the essentially elongated form. In FIG. 5b, the strip has already been bent to such an extent that the two segments connected by the web touch at a corner. In Figure 5c, the bending operation has been completed, and both segments butt against one another in a positive-locking manner. The abutting edge is closed so effectively that it is optically tight.

During the bending, the web is put under tensile stress and thereby produces a lever action which pulls the abutting edges of the two segments parallel to one another. This lever action is then assisted by the toothing, here a centering lug, in the segment edges opposite one another.

The web, which before the bending essentially enclosed a lozenge shape with the edges of the segments, is stretched in the process to roughly form a triangle.

If a ring-shaped element which has different outside diameters is bent, the webs preferably lie on one radius. This is achieved by embedding the webs more or less deep into the strip and thus into the radius of the ring-shaped element.

The strip according to the invention permits the production of ring-shaped electromagnetic elements, such as, for instance, stators and rotors, with a marked saving of material and costs. Thus about 10% of material can be saved in a preferred stator if it is produced from a strip and not from a conventional round lamination. In addition, the accessibility of the teeth, for instance of the stator teeth, enables an optimized copper filling factor to be achieved during the assembly of electric coils.

What is claimed is:

1. An elongated strip which can be formed for manufacturing a ring-shaped element of an electrical machine, the element having an electromagnetic effective area which is oriented perpendicularly to an axis of the ring-shaped element, the strip comprising:

segments which are separate from one another and together form the effective area of the element, and a web by which adjacent segments are directly connected, wherein the web is integrally formed on the outside of the element in such a way that the web runs outside the electromagnetic effective area of the element, and wherein the web has its smallest width in a region of a center of the web.

2. The strip according to claim 1, wherein the web, a first of said segments connected directly to the web, and a second of said segments directly adjacent to the first segment and connected directly to the web enclose a zone which is roughly in a lozenge shape.

3. The strip according to claim 2, wherein said ring-shaped element is a stator.

4. The strip according to claim 2, wherein said ring-shaped element is a rotor.

5. The strip according to claim 2, wherein a longer diagonal of the lozenge shape runs between points of the web at which the web merges into the first and second segments, and a shorter diagonal merges at a center of the web.

6. The strip according to claim 5, wherein said ring-shaped element is a stator.

7. The strip according to claim 5, wherein said ring-shaped element is a rotor.

8. The strip according to claim 5, wherein the web has a contour close to the zone which conforms, in a region of the center of the web, to an arc of a first circle, the first circle having a center which lies on the shorter diagonal of the lozenge shape, the radius of the first circle being smaller than the shorter diagonal.

9. The strip according to claim 8, wherein said ring-shaped element is a stator.

10. The strip according to claim 8, wherein said ring-shaped element is a rotor.

11. The strip according to claim 1, wherein the segments have lateral edges which are designed in such a way that the edges abutting at a butt joint can be bent together to form a tooth system.

12. The strip according to claim 11, wherein said ring-shaped element is a stator.

13. The strip according to claim 11, wherein said ring-shaped element is a rotor.

14. The strip according to claim 1, wherein the strip, in its longitudinal extent, has teeth on a side of the strip opposite the web.

15. The strip according to claim 14, wherein said ring-shaped element is a stator.

16. The strip according to claim 14, wherein said ring-shaped element is a rotor.

17. The strip according to claim 14, and further comprising an electric coil of coil wire wound around at least one of said teeth.

18. The strip according to claim 17, wherein said ring-shaped element is a stator.

19. The strip according to claim 17, wherein said ring-shaped element is a rotor.

20. The strip according to claim 17, wherein the coil wire has a variable cross-sectional shape over its length so that the coil wire is preformed in accordance with subsequent shaping after bending of the strip.

21. The strip according to claim 20, wherein said ring-shaped element is a stator.

22. The strip according to claim 20, wherein said ring-shaped element is a rotor.

23. The strip according to claim 17, wherein the coil is preformed to fit around the at least one of the teeth.

24. The strip according to claim 23, wherein said ring-shaped element is a stator.

25. The strip according to claim 23, wherein said ring-shaped element is a rotor.

26. The strip according to claim 1, wherein said ring-shaped element is a stator.

27. The strip according to claim 1, wherein said ring-shaped element is a rotor.

* * * * *